United States Patent
Struijk et al.

(10) Patent No.: US 9,434,554 B2
(45) Date of Patent: Sep. 6, 2016

(54) APPARATUS AND METHOD FOR SEPARATING OBJECTS

(71) Applicant: IG Specials B.V., Gameren (NL)

(72) Inventors: Wim Struijk, Delwijnen (NL); Wim Van Der El, Ameide (NL)

(73) Assignee: I.G. Specials B.V., Gameren (NL)

( * ) Notice: Subject to any disclaimer, the term of this patent is extended or adjusted under 35 U.S.C. 154(b) by 0 days.

(21) Appl. No.: 14/402,321

(22) PCT Filed: May 22, 2013

(86) PCT No.: PCT/EP2013/060557
§ 371 (c)(1),
(2) Date: Nov. 20, 2014

(87) PCT Pub. No.: WO2013/174893
PCT Pub. Date: Nov. 28, 2013

(65) Prior Publication Data
US 2015/0090643 A1    Apr. 2, 2015

(30) Foreign Application Priority Data
May 22, 2012    (NL) ..................................... 2008856

(51) Int. Cl.
*B07C 5/00*    (2006.01)
*B65G 47/28*    (2006.01)
(Continued)

(52) U.S. Cl.
CPC ............... *B65G 47/28* (2013.01); *B07C 5/342* (2013.01); *B65G 47/26* (2013.01)

(58) Field of Classification Search
CPC ............................... B65G 47/26; B65G 47/28
USPC .................................. 209/261, 306, 307, 577
See application file for complete search history.

(56) References Cited

U.S. PATENT DOCUMENTS 5,641,055 A    6/1997    Anderson
6,321,586 B1 *    11/2001    Wojtowicz ............... G01N 3/56
                                                                73/9
(Continued)

FOREIGN PATENT DOCUMENTS

DE    10112213 A1    10/2002
GB    1507365 A    4/1978
(Continued)

OTHER PUBLICATIONS

International Search Report of PCT/EP2013/060557 issued on Jul. 19, 2013.

*Primary Examiner* — Terrell Matthews
(74) *Attorney, Agent, or Firm* — Hoyng Rokh Monegier LLP; Ramin Amirsehhi; David P. Owen (57) ABSTRACT

The present invention relates to an apparatus for separating objects. The apparatus comprises a conveyor arrangement (1) and an actuator (30). The conveyor arrangement comprises a conveyor belt (10) disposed as an endless loop over two rollers (21, 22). The conveyor belt has a substantially horizontally arranged surface (5) for receiving a plurality of objects. The actuator comprises a drive axis (31), an actuating structure (32) and a connection structure connecting the drive axis with the actuating structure. The drive axis is connectible to a motor to enable rotational movement of the drive axis. The connection unit is arranged for converting the rotational movement into movement of the actuating structure in a direction substantially perpendicular to the object receiving surface plane. The actuating structure is located underneath the conveyor belt for creating movement of the surface in this direction. The conveyor arrangement and the actuator are independently controllable.

21 Claims, 8 Drawing Sheets

(51) Int. Cl.
*B65G 47/26* (2006.01)
*B07C 5/342* (2006.01)

(56) References Cited

U.S. PATENT DOCUMENTS

| | | | |
|---|---|---|---|
| 6,792,741 B1* | 9/2004 | Theriault | B65B 5/108 53/241 |
| 8,807,331 B2* | 8/2014 | Beltman | B65G 23/44 198/806 |
| 2007/0022854 A1* | 2/2007 | Gambini | B26D 3/001 83/167 |
| 2010/0006393 A1* | 1/2010 | LeCroy | B65G 47/766 198/370.02 |
| 2013/0333600 A1 | 12/2013 | Struijk et al. | |
| 2014/0309882 A1* | 10/2014 | Antchak | F02B 67/06 701/36 |
| 2015/0090643 A1* | 4/2015 | Struijk | B65G 47/26 209/577 |

FOREIGN PATENT DOCUMENTS

| | | |
|---|---|---|
| GB | 2201647 A | 9/1988 |
| NL | 1038540 | 4/2008 |

* cited by examiner

APPARATUS AND METHOD FOR SEPARATING OBJECTS

FIELD OF THE INVENTION

The invention relates to an apparatus for separating objects. Additionally, the invention relates to a method for separating objects. Finally, the invention relates to a computer readable medium, having computer readable instructions stored thereon for performing, when executed by a processor, a method for separating objects.

BACKGROUND OF THE INVENTION

In many industrial, horticultural and agricultural applications, objects are supplied in bulk which need to be processed further on an individual basis. Separating these objects may be time consuming if done by hand. However, automating such separation may be very costly. Additionally, it is undesirable that separating bulk objects occupies significant space that may be used for other processes that add more value to the objects. Finally, it is desirable to have a single machine that can handle the separation of different objects, so that the same machine may be used for different applications.

SUMMARY OF THE INVENTION

It is an object of the invention to provide an apparatus for separating objects in a time and cost efficient manner, while occupying limited space. For this purpose, embodiments of the invention relate to an apparatus for separating objects comprising: a conveyor arrangement comprising a conveyor belt disposed as an endless loop over two rollers, the conveyor belt having a substantially horizontally arranged surface for receiving a plurality of objects; and an actuator comprising a drive axis connectible to a motor so as to enable rotational movement of the drive axis, an actuating structure, and a connection structure connecting the drive axis with the actuating structure for converting rotational motion of the drive axis into a movement of the actuating structure in a direction substantially perpendicular to the object receiving surface plane, wherein the actuating structure is located underneath the conveyor belt for creating movement of the surface in a direction substantially perpendicular to the object receiving surface plane, wherein the conveyor arrangement and the actuator are independently controllable.

The actuating structure may be arranged to create irregular movement of the object receiving surface. Such irregular movement shakes the objects which assists them to disentangle and separate from each other.

The conveyor belt may be controllably moveable in two mutually opposing directions by actuation of at least one of the two rollers. Linear movement may transfer objects from one end of the surface towards another end of the surface, whereas acceleration and/or deceleration of the surface may cause the objects to spread out over the surface.

In some embodiments, the apparatus further comprises a belt tensioning roller mounted on an arm that is pivotably connected to the actuating structure. The belt tensioning roller aids to keep tension on the belt during operation of the actuating structure, and may reduce movement of the belt in a surface-plane direction substantially perpendicular to the forward and reverse directions of the conveyor belt upon actuation of the rollers.

In some further embodiments, the actuating structure further comprises a guiding roller that is connected at a position at a side of the actuating structure facing away from the belt tensioning roller. The use of a guiding roller reduces wear of the belt caused by friction between the belt and a backside of the actuating structure.

In some embodiments, the conveyor arrangement further comprises a plate between the two rollers for supporting the object receiving surface of the conveyor belt. The use of a supporting plate reduces sagging of the object receiving surface between the rollers. The plate may be provided with a plurality of holes. The holes reduce, or may even avoid, the development of a subnormal pressure underneath the object receiving surface during upward movement of the actuating structure. In some embodiments, the holes take the form of slits oriented in a direction substantially parallel to the direction of movement of the conveyor belt. Such orientation reduces wear of the conveyor belt due to scratching with hole edges in direction that could cause belt rupture. To further reduce wear caused by holes edges, such slit-shaped holes may be provided with rounded ends.

In some embodiments, the actuating structure extends over the entire width of the conveyor belt. The use of an actuating structure that extends over the entire conveyor belt width reduces the chance that the belt moves in an in-plane direction substantially perpendicular to the direction of conveyor belt movement.

To enhance the structural integrity of the actuator, the actuating structure may be shaped in accordance with a U-profile.

In some embodiments, the extent of movement in a direction substantially perpendicular to the object receiving surface of the conveyor belt is adjustable. Such adjustability may enable an operator to optimize the performance of the separating apparatus in view of characteristics of the objects to be separated. For example, soft or rubbery objects may need a larger vertical movement to achieve sufficient separation than hard metal or plastic objects.

Preferably, in embodiments of the invention, the apparatus further comprises a camera system comprising one or more cameras for obtaining one or more images of the plurality of objects on the object receiving surface. Such images may help to assess whether or not the conveyor belt and/or actuating unit should be moved, and if so, in what manner.

In a preferred embodiment, the apparatus further comprises a robot provided with a gripping system provided with one or more grippers for picking up individual objects from the object receiving surface for further processing. Picking up individual objects is then preferably based on information obtained from one or more images obtained with a camera system.

In some embodiments, independently controlling movement of the conveyor belt and the actuator is executed by a control unit. Preferably, the apparatus further comprises a camera system, and most preferably also comprises a robot. The control unit then preferably performs the control steps based on information obtained from one or more images obtained with the camera system.

In some embodiments, the apparatus further comprises a light source located underneath the object receiving surface, and the conveyor belt is made of a material substantially transparent for radiation emitted by the light source. Such arrangement is particularly useful if the objects to be separated are highly reflective in nature.

In a particularly preferred embodiment, the apparatus comprises a conveyor arrangement, an actuator comprising an actuating structure, a camera system, a robot and a control unit as described above.

Some embodiments of the invention relate to a method of separating objects comprising: supplying a plurality of objects to an apparatus for separating objects as described above; and independently controlling movement of the conveyor belt and the actuating structure to separate the plurality of objects.

In embodiments in which the apparatus comprises a camera system comprising one or more cameras, independently controlling of the movement of the conveyor belt and the actuator may be performed based on analysis of one or more images obtained with the camera system.

In embodiments in which the apparatus comprises a camera system and a robot provided with a gripping system provided with one or more grippers for picking up individual objects from the object receiving surface, the method may further comprise: identifying individual objects among the plurality of objects that are suitable for individual pick up by means of one or more images obtained with the camera system; and picking up an identified object with the robot for further processing.

In embodiments in which the apparatus comprises a control unit being provided with a movement program, independently controlling movement of the conveyor belt and the actuating structure may be executed by the control unit by activating the movement program.

Finally, some embodiments of the invention relate to a computer readable medium having computer readable instructions stored thereon for performing, when executed by a processor, a method of separating objects as defined above. This embodiment is in particular preferable if the apparatus comprises one or more cameras and/or a robot for gripping objects.

BRIEF DESCRIPTION OF THE DRAWINGS

Various aspects of the invention will be further explained with reference to embodiments shown in the drawings wherein.

DESCRIPTION OF ILLUSTRATIVE EMBODIMENTS

The following is a description of various embodiments of the invention, given by way of example only and with reference to the drawings.

Figure 1A:
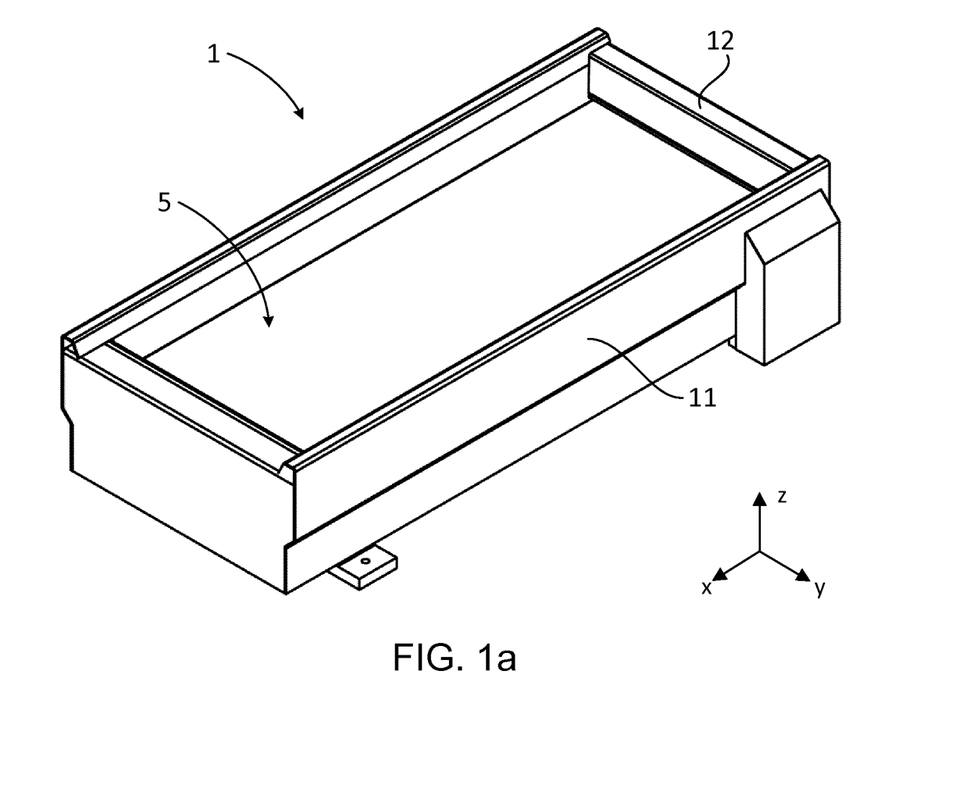
FIG. 1a shows an elevated top view of a portion of an apparatus for separating objects according to an embodiment of the invention.

FIG. 1a shows an elevated top view of a portion of an apparatus for separating objects according to an embodiment of the invention. In one embodiment, the apparatus is used for agricultural/horticultural applications. In another embodiment, the apparatus is not used for such applications, but used for separating non-living objects such as metal, plastic, rubber and paper parts.

Figure 1B:
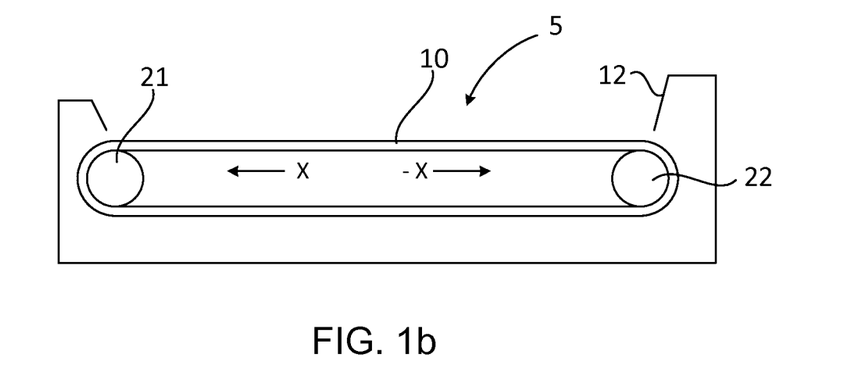
FIG. 1b shows a side view of a conveyor arrangement.

In particular, FIG. 1a shows a top surface 5 of a conveyor arrangement 1 that is shown in more detail in FIG. 1b. The conveyor arrangement 1 comprises a conveyor belt 10 disposed as an endless loop over two rollers 21, 22. The conveyor belt has a substantially horizontally arranged surface for receiving a plurality of objects, i.e. the top surface 5, hereafter referred to as object receiving surface 5. The conveyor belt 10 is moveable in a predetermined direction, in FIG. 1 denoted the x-direction by rotation about the two rollers 21, 22. One or both of the rollers 21, 22 maybe actuated, for example by an engine connected via a shaft to the center of the roller(s). Upon actuation of one or both of the rollers 21, 22 the conveyor belt 10 may move in the two mutually opposing directions depicted in FIG. 1, i.e. +x and −x. Hereafter the x-direction and the −x-direction may be referred to as forward and reverse directions respectively.

The conveyor arrangement 1 may comprise one or more side walls 11 and end walls 12 so that, together with the object receiving surface 5, a container is formed for accommodating objects to be separated. The one or more side walls and/or end walls 12 reduce the chance that objects supported by the object receiving surface 5 fall off at least partially, be surrounded by a housing to limit contamination. Furthermore, the object receiving surface 5 of the conveyor belt may be placed within such housing such that the surface 5 has side walls 11, and end walls 12 to ensure that objects supported by the object receiving surface 5 do not fall down during execution of a method of separating the objects.

The objects that are to be separated by means of the apparatus for separating according to embodiments of the invention are generally bulk products and may include, but are not limited to industrial, horticultural and agricultural objects. Examples of such bulk objects include, but are not limited to, plant cuttings, bolts, nuts, injection-molded objects, blanking caps, and tooth brush handles.

Figure 2A:
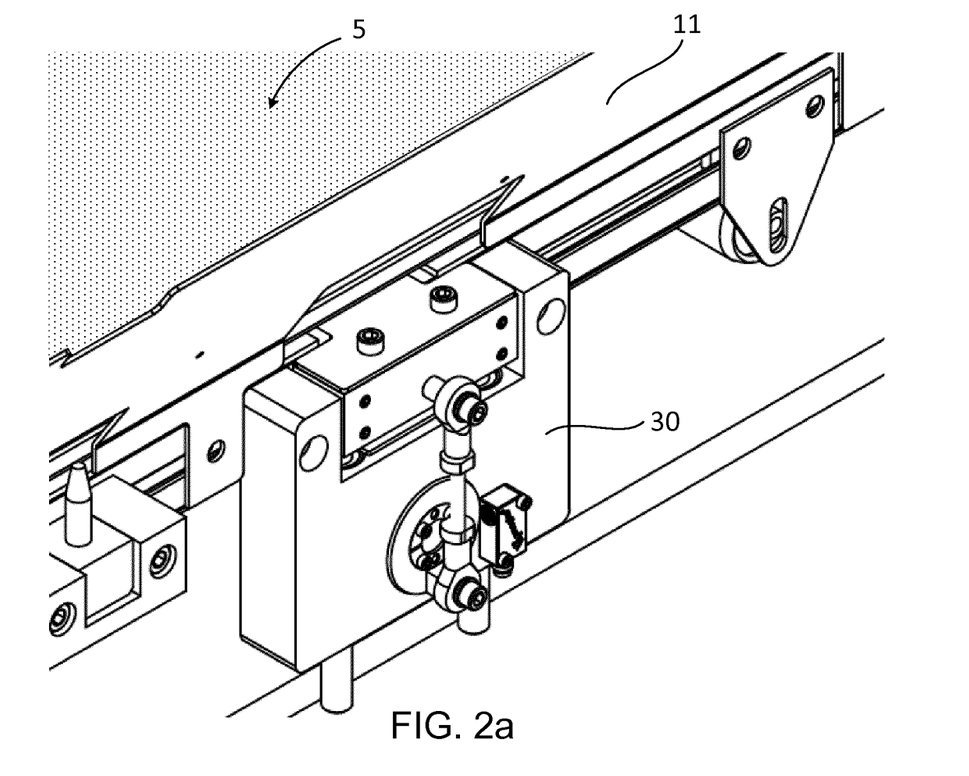
FIG. 2a shows an elevated view of a portion of a conveyor arrangement.

FIG. 2a shows an elevated view of a portion of a conveyor arrangement such as the conveyor arrangement of FIG. 1. In particular, FIG. 2a shows a side wall 11 adjacent to the object receiving surface 5 provided with an actuator 30 for creating surface movement in a direction substantially perpendicular to the surface 5, i.e. to create movement in a z-direction when the surface lies in an x-y plane. The actuated movement in the z-direction is preferably a non-linear movement.

Figure 2B:
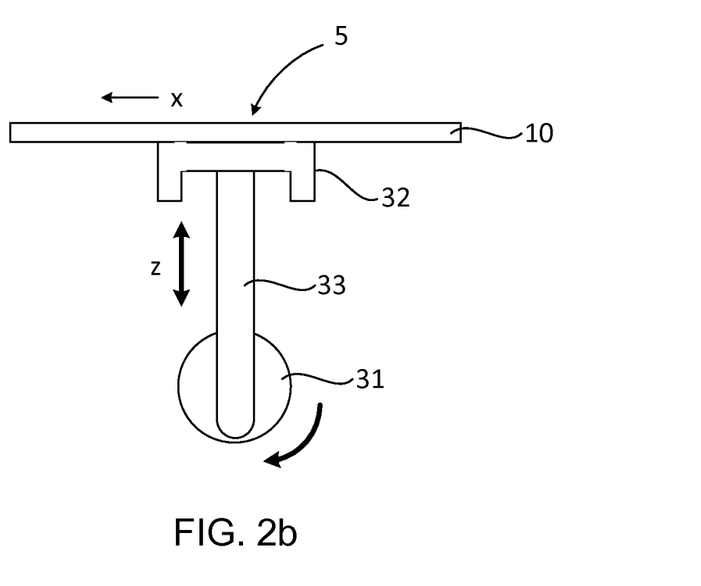
FIG. 2b schematically shows a driving mechanism for irregular movement of a surface.

FIG. 2b schematically shows a driving mechanism for irregular movement of a surface as applied by an actuator such as actuator 30 in FIG. 2a. The irregular movement induced by this mechanism is a non-linear movement FIG. 2b in a direction substantially perpendicular to the surface. In the mechanism shown in FIG. 2b a driving unit, e.g. an electromotor, is arranged to drive a drive axis 31 into a rotational motion. The drive axis 31 is connected to a bottom surface actuating structure 32. The drive axis 31 and the actuating structure 32 are connected to each other by means of a rigid connection unit 33. As may be seen in FIG. 2a, the connection unit 33 is connected to the drive axis 31 at an eccentric position. As a result of this eccentric connection, the rotational motion of the drive axis 31 is converted into a movement of the actuating structure 32 in a direction substantially perpendicular to the object receiving surface 5, i.e. the z-direction. As a result of the movement in the z-direction, objects are "shaken" and can spread out over the surface 5. The movement may further improve separation and disentanglement of a plurality of objects to obtain individual objects suitable for further processing. In some embodiments, further irregularity in the movement of the bottom surface may be obtained by using a drive axis with a non-circular cross-section, for example an elliptical cross-section.

Because the movement of the actuating structure 32 is in a direction substantially perpendicular to the object receiving surface 5, friction between the actuating structure 32 and the object receiving surface 5 due to horizontal movement of the surface 5 with respect to the actuating structure 32 will be minimized. If the actuating structure 32 is activated while the object receiving surface is not driven by any one of the rollers 21, 22, such friction will not be present at all. Consequently, lifetime reduction of the conveyor belt 10 due to abrasive friction is limited. Further reduction of above-mentioned friction, in particular in cases where both the conveyor belt and the actuating structure are activated, may be achieved by using an actuating structure 32 provided with a roller instead of a U-shaped profile.

Preferably, the actuating structure 32 extends over the entire width of the conveyor belt 10. Spreading the irregular movement over the entire width reduces movement of the belt to the side in an in-plane direction perpendicular to the forward or reverse direction, i.e. a y-direction.

Preferably, the actuating structure 32 has an U-shaped profile. Most preferably, the bottom of the U-profile is used to move the surface 5. The use of an U-shaped profile strengthens the construction, and therefore improves the reliability of the apparatus.

Figure 2C:
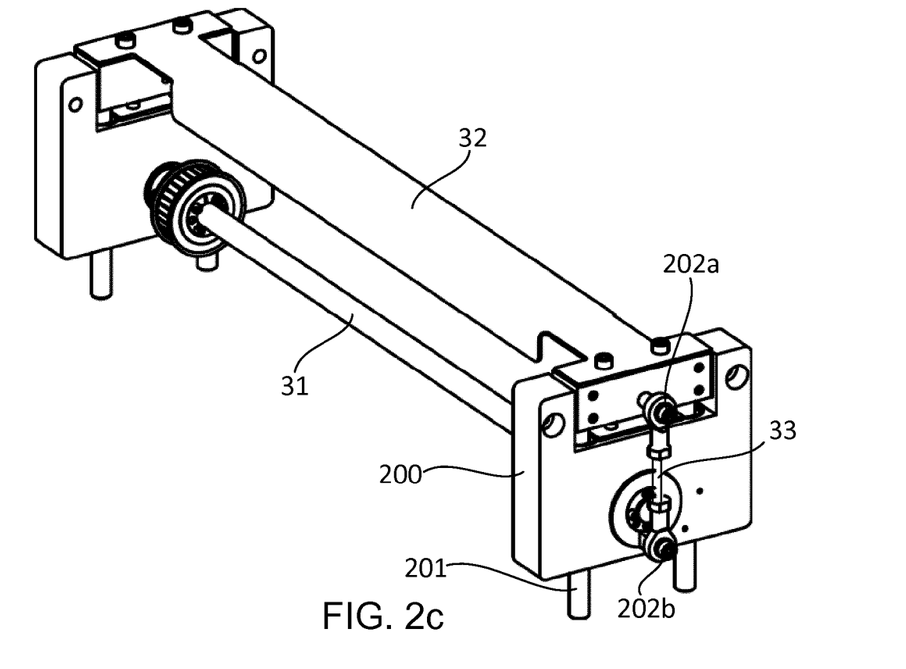
FIGS. 2c, 2d show an elevated side view of a mechanism for inducing local deformation of a conveyor surface at different moments in time.
Figure 2D:
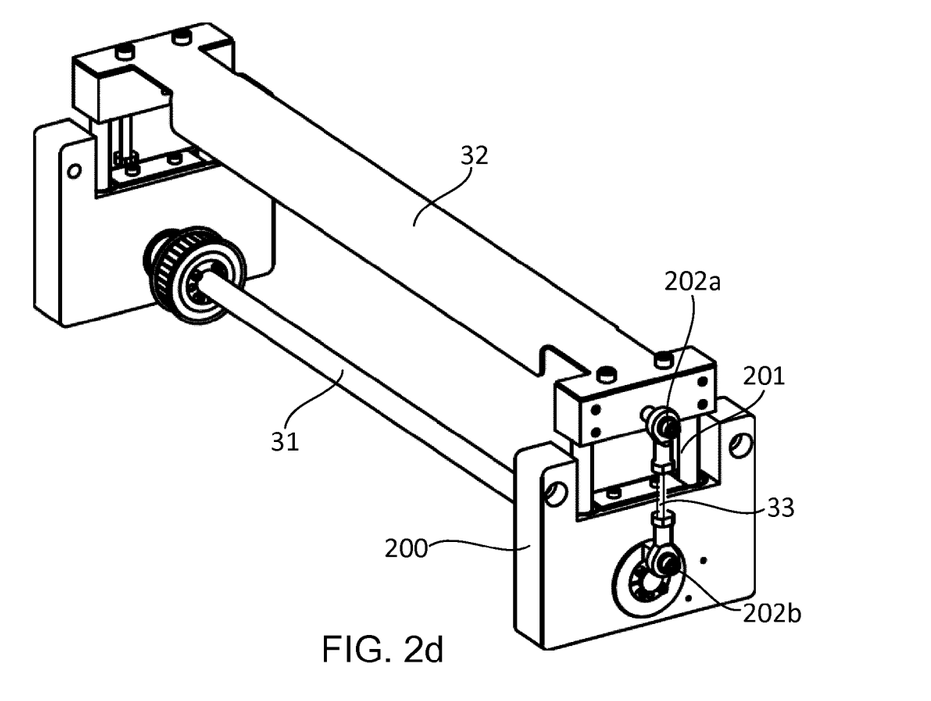

FIGS. 2c, 2d show an elevated side view of a mechanism for inducing local deformation of a conveyor surface at different moments in time during use. In FIG. 2c, the actuating structure 32 is at its lowest position, whereas in FIG. 2d, the actuating structure 32 is at its highest position. The movement in a direction substantially perpendicular to the conveyor surface is obtained by using a guiding body 200 provided with one or more holes that are arranged for accommodating corresponding pins 201. The pins 201 are connected, preferably in a rigid fashion, to the actuating structure 32 and extend in a substantially vertical direction, i.e. the z-direction. Movement of the actuating structure 32 in directions in plane with the conveyor surface are further limited by allowing the connection unit 33 to be pivotably, connected to the actuating structure 32 by a suitable bearing connection 202a, and to the drive axis 31 by a suitable bearing connection 202b. As explained with reference to FIG. 2b, the bearing connection 202b engages with the drive axis 31 at an eccentric position.

Preferably, the extent of movement in a direction substantially perpendicular to the object receiving surface 5 of the conveyor belt 10 is adjustable. Such adjustability enables an operator to optimize the performance of the separating apparatus in view of characteristics of the objects to be separated. For example, an operator may adjust the extent of movement in the z-direction in FIG. 2b in view of the weight of the objects to be separated. Similarly, soft or rubbery objects may need a larger vertical movement to achieve sufficient separation than hard metal or plastic objects. In the embodiment of depicted in FIGS. 2a-2d, adjustment of the extent of movement in the z-direction may be achieved by lengthening or shortening the connection unit 33.

Figure 3:
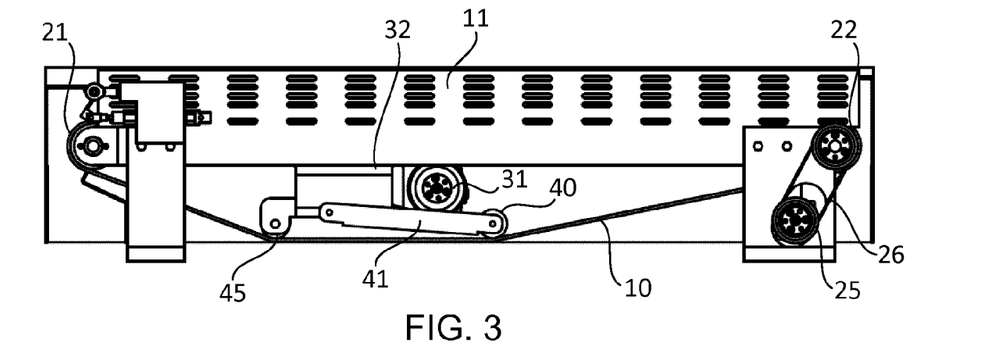
FIG. 3 shows a side view of an apparatus for separating objects.
Figure 4A:
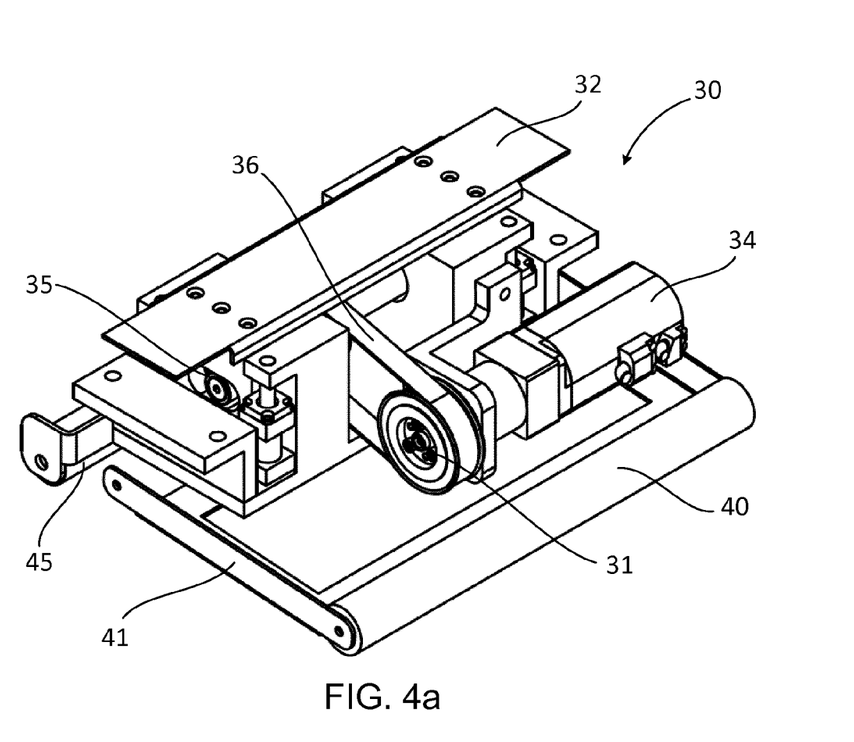
FIGS. 4a, 4b show different elevated views of an actuator provided with a belt tensioning roller.
Figure 4B:
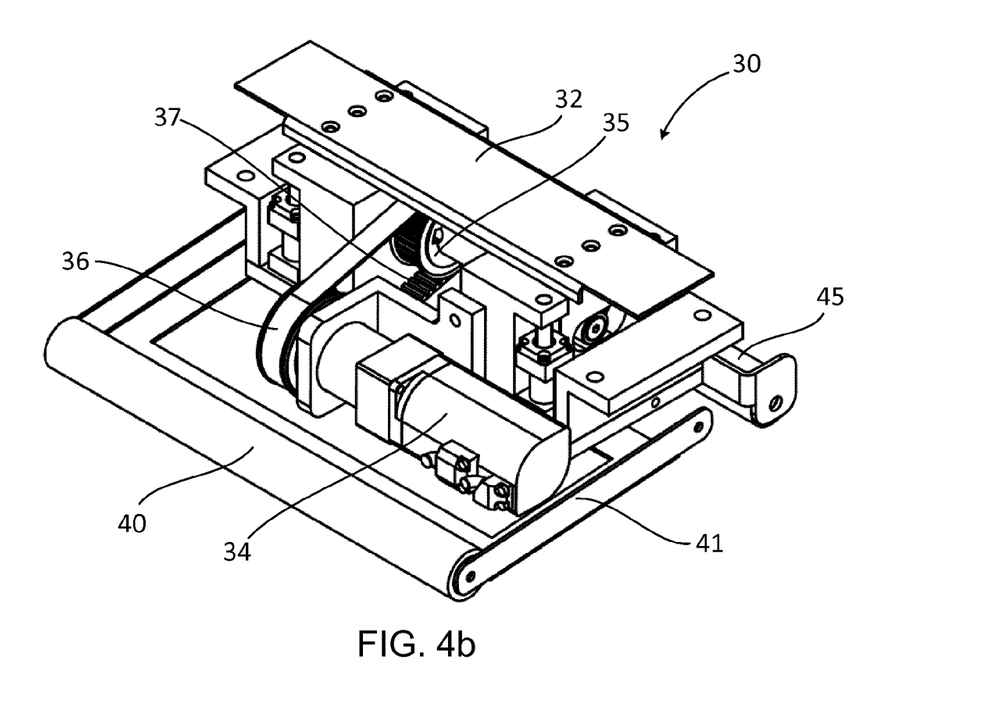

FIG. 3 shows a side view of an apparatus for separating objects according to an embodiment of the invention. In this embodiment, the conveyor belt 10 is driven via a drive pulley or roller 25 connected to roller 22 by means of a belt 26. The other roller 21 idle. The embodiment of the apparatus depicted in FIG. 3 further comprises a belt tensioning roller 40 mounted on an arm 41 that is pivotably connected to the actuating structure 32. A more detailed view of such arrangement is depicted in FIGS. 4a and 4b.

Upon actuation of the irregular movement by means of the actuation structure 32 the belt tensioning roller 40 pivots about the point at which it is connected to the actuation structure 32. As a result, the belt tensioning roller 40 keeps tension on the belt 10, and may reduce movement of the belt in a direction substantially perpendicular to the forward and reverse directions. Such sideway movement may reduce the performance of the apparatus for separating.

Note that the orientation of the actuation structure 32 differs from the orientation shown in FIG. 2b. However, the actuation structure 32 is subjected to a similar movement, as will be shown in FIGS. 4a and 4b.

Preferably, the actuating structure 32 is further connected to a guiding roller 45. The guiding roller 45 is connected at a position at a side of the actuating structure 32 facing away from the belt tensioning roller 40. The guiding roller 45 is arranged to guide the conveyor belt 10 past the actuating structure 32 so as to avoid, or at least reduce, contact with the actuating structure 32. By reducing, and preferably avoiding such contact, the conveyor belt 10 undergoes less friction and its lifetime is increased.

FIGS. 4a, 4b show different elevated views of the actuator 30 provided with a belt tensioning roller 40. As can be seen in FIGS. 4a, 4b, the actuating structure 32 is indirectly driven by a motor 34. The motor 34 drives a drive axis 31 which is connected to a further drive axis 35 via a belt 36. The drive axis 35 may then actuate the actuating structure 32 in a way similar to the way described with reference to FIG. 2b.

In the embodiment depicted in FIG. 4a, 4b, the belt 36 is provided with a plurality of teeth or notches 37. The use of a notched or teethed belt may reduce disturbances as compared to a belt sliding over pulleys.

Figure 5:
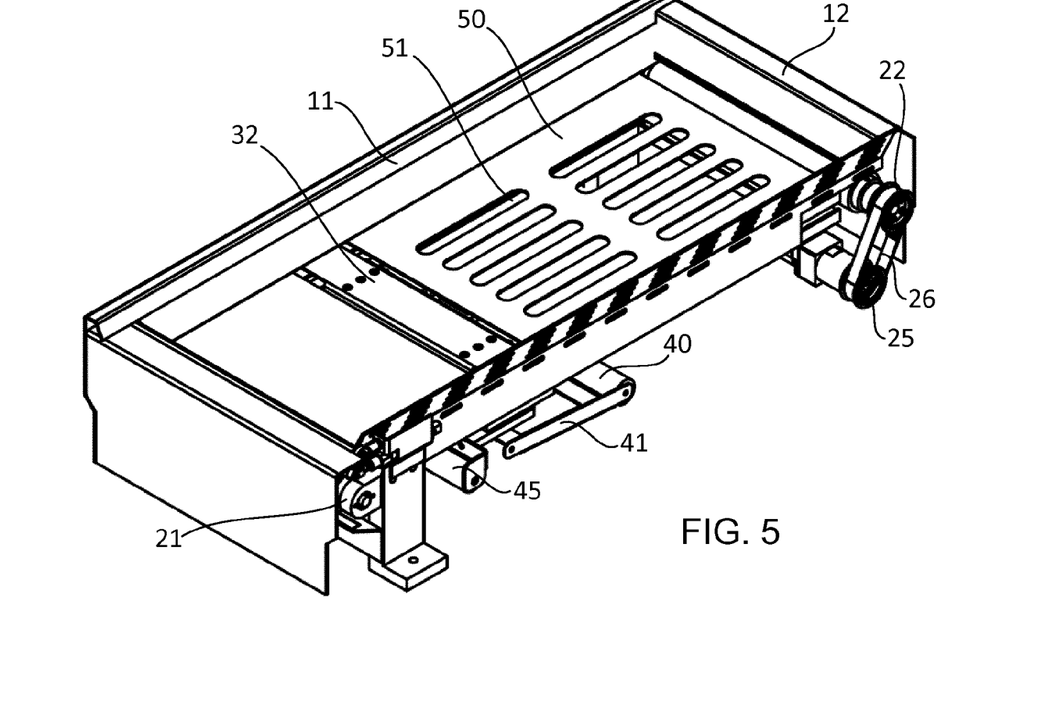
FIG. 5 shows an elevated top view of the apparatus from which the conveyor belt is removed.

FIG. 5 shows an elevated top view of an embodiment of the apparatus for separating objects without the conveyor belt. Preferably, an example of which is shown in the embodiment of FIG. 5, the conveyor arrangement further comprises a plate 50 between the two rollers 21, 22 for supporting the object receiving surface of the conveyor belt. Such plate reduces sagging of the object receiving surface 5 between the rollers 21, 22. The plate does not support the surface 5 over the entire length between the rollers 21, 22 to allow the actuating structure 32 to operate properly.

Preferably, the plate 50 is provided with a plurality of holes 51. Particularly in cases where the plate 50 supports a great portion of the surface 5, movement of the surface 5 in the z-direction under the influence of the actuating structure 32 may create an subnormal pressure below the surface 5. The presence of such subnormal pressure may cause objects lying on the surface 5 to be sucked underneath the surface 5. The presence of holes 51 reduces, and preferably avoids, the development of such subnormal pressure.

Preferably, the holes 51 take the form of slits oriented in the direction of forward and reverse movement of the conveyor belt 10. The size of the holes 51 is then relatively large and contact between the edges of the holes 51 and the conveyor belt 10 results at most in scratches on the conveyor belt 10 in a direction that is less susceptible to cause belt rupture. As a result, the lifetime of the conveyor belt 10 may increase. To further reduce wear caused by holes edges, the slit-shaped holes 51 may be provided with rounded ends.

Figure 6A:
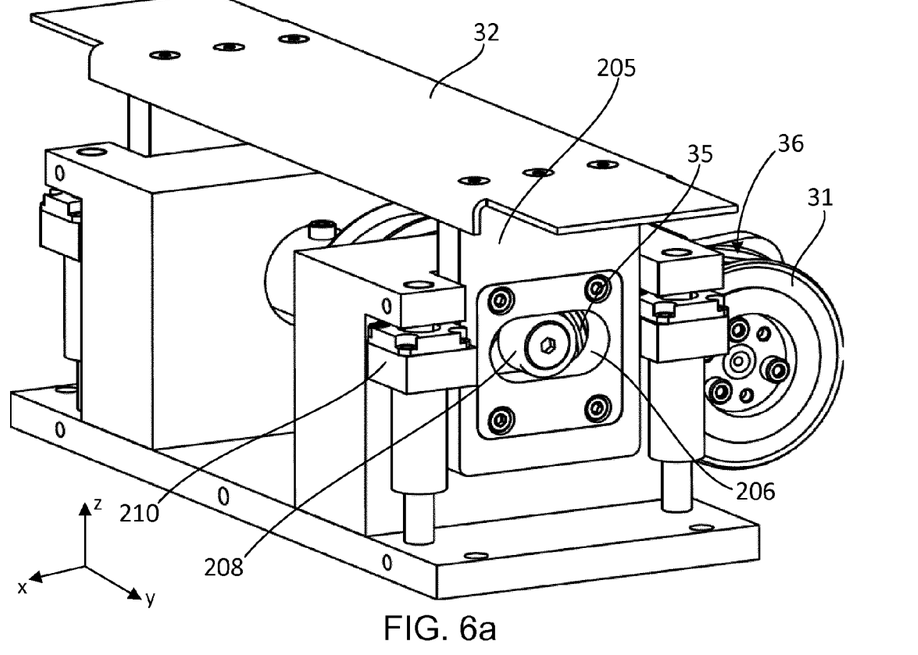
FIGS. 6a, 6b shows an elevated side view of another mechanism for inducing local deformation of a conveyor surface at different moments in time.
Figure 6B:
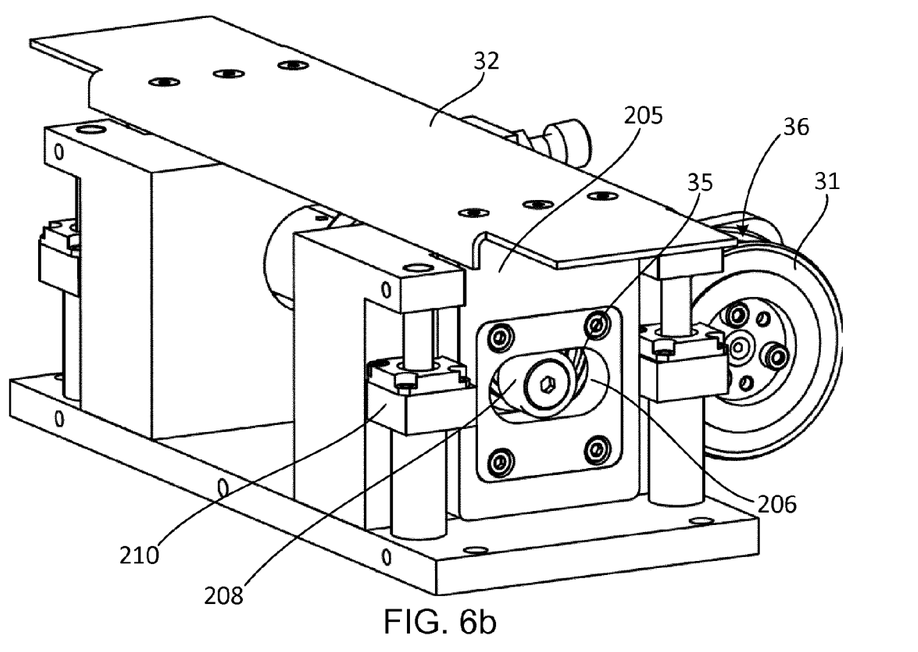

FIGS. 6a, 6b shows an elevated side view of another mechanism for inducing local deformation of a conveyor surface at different moments in time during use. In FIG. 6a, the actuating structure 32 is at its lowest position, whereas in FIG. 6b, the actuating structure 32 is at its highest position.

In the arrangement depicted in FIGS. 6a, 6b, the drive axis 31 is connected to a further drive axis 35 via a belt 36 in a similar way as depicted in FIGS. 4a, 4b. However, it will be understood that a driving mechanism as shown in FIGS. 2a-2d with only a single drive axis 31 may be used as well.

The movement in a direction substantially perpendicular to the conveyor surface is obtained in a way different from the mechanism depicted in and described with reference to FIGS. 2a-2d. In the arrangement of FIGS. 6a, 6b, the interacting structure 32 is connected to a plate 205 that extends in a substantially vertical direction, i.e. a z-direction, as well as in a direction substantially parallel to the direction of movement of the conveyor belt, i.e. the x-direction. The plate 205 is provided with a slit 206 which extends in a horizontal direction, i.e. substantially parallel to the x-direction. The slit is arranged to accommodate a plug 208. The plug is connected to the further drive axis 35 at an eccentric position. As a result, rotation of the further drive axis 35 would result in a circular movement of the plug 208 if the plug would be allowed to move freely. However, because free movement of the plug 208 in a vertical direction is disallowed by the slit 206, the plate 205 is moved up and down while the plug moves from left to right and vice versa through the slit. Consequently, rotational motion of the further drive axis 35 is converted into a movement of the actuating structure 32 in a direction substantially perpendicular to the object receiving surface plane of the conveyor belt.

As depicted in FIGS. 6a, 6b, further guidance of the plate 205 in the z-direction may be established by use of a suitable guiding structure 210. The use of a such guiding structure 210 enhances the robustness and reliability of the arrangement.

Figure 7A:
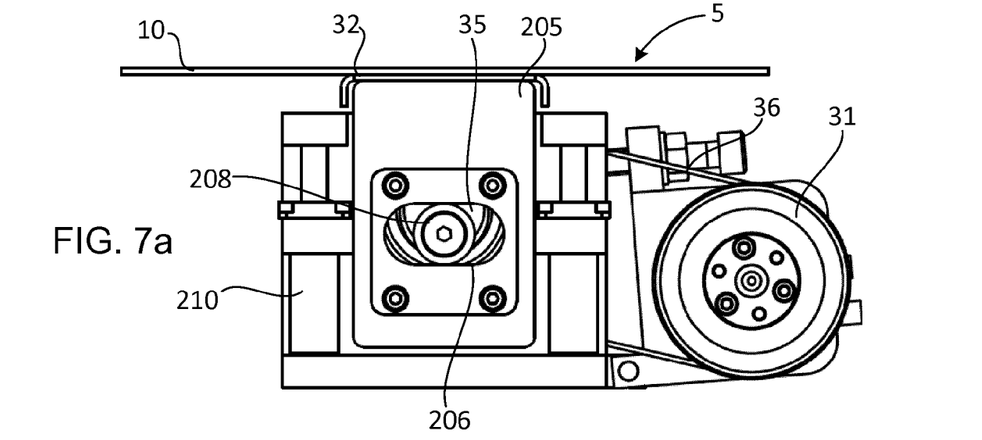
FIGS. 7a, 7b, 7c show a side view of the mechanism of FIGS. 6a, 6b at different moments in time.
Figure 7B:
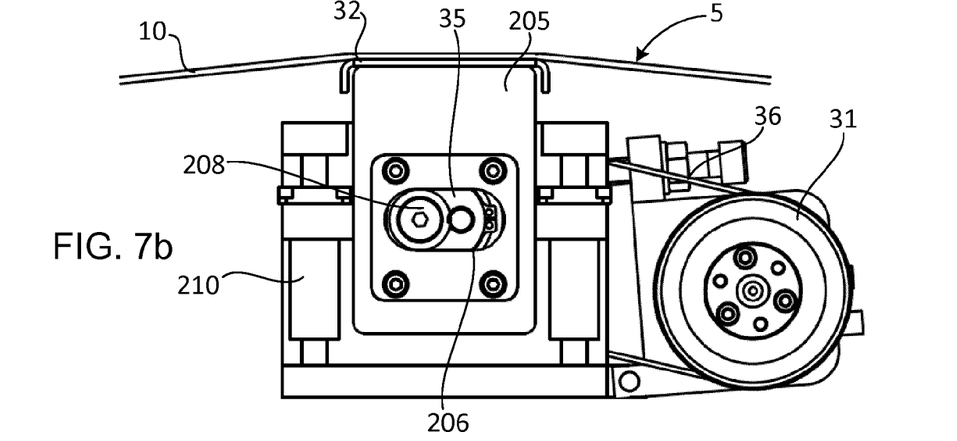
Figure 7C:
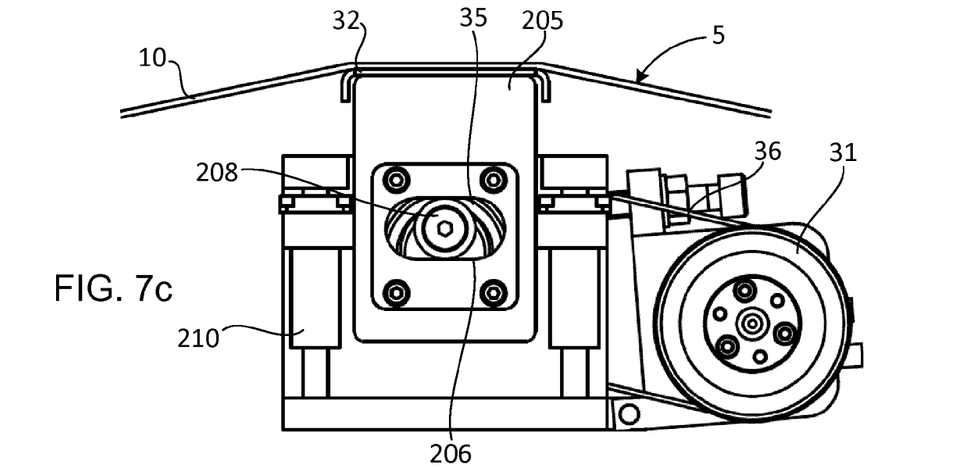

FIGS. 7a, 7b, 7c show a side view of the mechanism of FIGS. 6a, 6b at different moments in time. In these three exemplary drawings abovementioned vertical movement of the actuating structure 32 and the plate 205 in combination with the substantially horizontal movement of the plug 208 through the slit 206 in the plate 205 is shown. In FIG. 7a, the actuating structure 32 is in contact with the conveyor belt 10. In this example, the plug 208 is located in center of the slit 206, and the plate 205 is at its lowest position. In FIG. 7b, the plug 208 has moved to he left, and the plate 205 has moved upwards which results in a lifting of the conveyor belt 10 by the actuating structure 32. In FIG. 7c, the plug 208 is again in the center of the slit 206, but the plate is now at its highest position. Consequently, the conveyor belt 10 is lifted even higher by the actuating structure 32.

Preferably, the extent of movement in a direction substantially perpendicular to the object receiving surface 5 of the conveyor belt 10 is adjustable. In the embodiment of depicted in FIGS. 6a, 6b and 7a-7c, adjustment of the extent of movement in the z-direction may be achieved by changing the eccentricity of the position at which the plug 208 is connected to the further drive axis 35.

Figure 8:
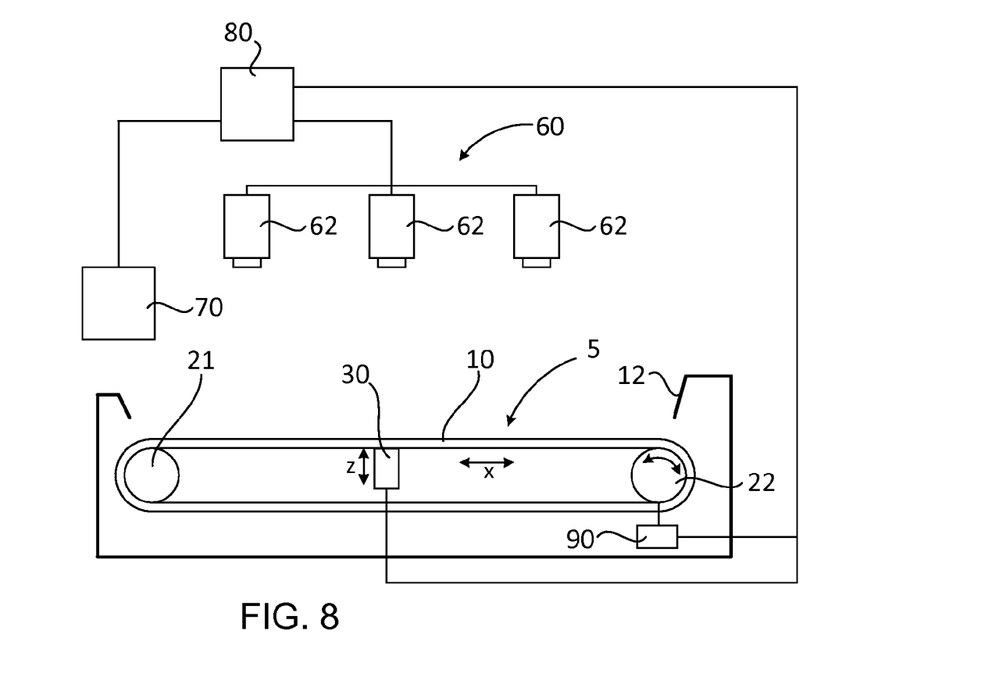
FIG. 8 schematically shows an apparatus for separating objects according to an embodiment of the invention.

FIG. 8 schematically shows an apparatus for separating objects according to an embodiment of the invention. The apparatus comprises a conveyor arrangement as discussed with reference to FIG. 1b. That is, the conveyor arrangement comprises a conveyor belt 10 disposed as an endless loop over two rollers 21, 22, and has a substantially horizontally arranged surface 5 for receiving a plurality of objects. The apparatus further comprises an actuator 30 for creating surface movement in a direction substantially perpendicular to the object receiving surface 5, for example in a way as discussed above.

The surface 5 may thus be moved in the z-direction by means of the actuator 30, as well as in the x-direction by means of at least one of the two rollers 21, 22. By combining movement of the surface 5 in the x-direction, and driving the actuator 30 to create movement of the bottom surface 5 in a direction substantially perpendicular thereto, irregular movement can be created in a controllable fashion. As a result of the irregular movements in both x- and z-directions, the objects provided on the surface 5 may be separated.

Consequently, the surface 5 may be moved in any one of the following ways. Firstly, the surface 5 may be moved in a first horizontal direction, e.g. the +x-direction or "forward direction", by means of at least one of the two rollers 21, 22, while the surface 5 is moved in a direction substantially perpendicular to the object receiving surface plane, i.e. the z-direction, by means of the actuator 30. Secondly, the surface 5 may be moved in a second horizontal direction, e.g. the −x-direction or "backward" direction, by means of at least one of the two rollers 21, 22, while the surface 5 is moved in a direction substantially perpendicular to the object receiving surface plane, i.e. the z-direction, by means of the actuator 30. Thirdly, the surface 5 may be moved in the first or second horizontal direction, while the actuator 30 does not create movement in in a direction substantially perpendicular to the object receiving surface plane, i.e. the z-direction. This may be done by de-activation of the actuator, for example by de-activating driving of the drive axis 31. Alternatively, de-activation may be achieved by decoupling the actuating structure 32 from the drive axis 31. Finally, the surface 5 may be moved in a direction substantially perpendicular to the object receiving surface plane, i.e. the z-direction, by means of the actuator 30, while the horizontal position of the surface 5 remains the same. Independent control of movement of the surface 5 in a horizontal direction by means of at least one of the two rollers 20, 21 on the one hand, and movement of the surface 5 in a substantially vertical direction by means of the actuator 30 on the other hand opens the possibility to create an optimal movement scheme for separation and disentanglement of objects that are present on the surface 5. Besides the types of movement described above, the velocity and acceleration/deceleration of the different movements may be controlled as well. It will be understood that the rollers 20, 21 may move at a different rotational velocity than the drive axis 31 of the actuator 30. The flexibility of the design enables creation of an optimal separation and/or disentanglement strategy for many different object types.

Additionally, the apparatus comprises a camera system 60 for identifying an object distribution on the object receiving surface 5 of the conveyor belt 10, and a control unit for independently controlling movement of the conveyor belt 10 and the actuating structure based on object distribution information obtained from the camera system 60.

In some embodiments, the apparatus further comprises a light source located underneath the conveyor belt 10 for emitting light, and the conveyor belt 10 is at least partially transparent for the light emitted by the light source. Such combination of light source and transparent conveyor belt 10 may be particularly useful if the objects to be separated have a are reflective in nature. Identifying an object that reflects light easily may be difficult, because the reflections may give an incorrect impression of the location of the object. Additionally, the combination of light source and transparent conveyor belt may be useful if the analysis of the images obtained with the camera system uses pattern recognition techniques based on object shape.

In some applications, the camera system 60 is used to identify objects that are suitable for individual pick up by a pick-up tool or robot 70. The robot 70 may pick-up the identified object and transfer the object to another location for further processing. An example of an application where such robot is used will be discussed with reference to FIG. 9, which relates to a system for planting individual cuttings in a cutting cultivation medium.

The camera system 60 may include a one or more cameras 62. The object distribution and/or identification of objects for individual pick-up may be based on images obtained with the one or more cameras 62. For this purpose, pattern recognition techniques may be used. The images provided by the camera system 60 may be any type of suitable image including 2-dimensional images and 3-dimensional images. In case of 3-dimensional imaging, the camera system 60 generally includes more than one camera 62.

Both the surface movements and temporary surface deformations may be controllable with a control unit 80. The control unit 80 can take the form of a computer or any other suitable control device known to those skilled in the art. The control unit 80 may be instructed to execute a program. The control unit 80 is arranged to independently control movement of the conveyor belt 10 and the actuating structure, such as actuating structure 32 that is part of the actuator 30. For this purpose, the control unit 80 may be communicatively coupled to the actuator 30 and to a drive unit 90 for driving at least one of the rollers 21, 22, as schematically depicted in FIG. 8.

The control unit 80 is communicatively coupled to the camera system 60. The control unit 80 may base movement of the conveyor belt 10 and actuating structure in the actuator 30 based on information obtained from the camera system 60.

The control unit 80 may comprise a computer system comprising a processor with peripherals to enable operation of a method for separating using the apparatus discussed above. The processor may be connected with one or more memory units which are arranged for storing instructions and data, one or more reading units, one or more input devices, such as a keyboard, touch screen, or mouse, and one or more output devices, for example a monitor. Further, a network Input/Output (I/O) device may be provided for a connection to the networks.

The processor may comprise several processing units functioning in parallel or controlled by one main processor, that may be located remotely from one another, possibly distributed over the local area network, as is known to persons skilled in the art. The functionality of the present invention may be accomplished by a combination of hardware and software components. Hardware components, either analogue or digital, may be present within the processor or may be present as separate circuits which are interfaced with the processor. Further it will be appreciated by persons skilled in the art that software components that are executable by the processor may be present in a memory region of the processor.

The control unit 80 may be arranged to execute a movement program to be applied to the irregularly moveable surface 5 in dependence of one or more images obtained with the camera system 60. For example, in some applications, if the camera system 60 cannot detect sufficient individual objects on the irregularly moveable surface 5, the camera system 60 may instruct the control unit 80 to execute the movement program to shake the objects in a controllable fashion to further individualize the objects.

Such movement program contains computer readable instructions that may be stored on a computer readable medium. The computer readable medium having the movement program stored thereon may be provided to the control unit 80 to perform, when executed by a processor in the control unit 80, the movement program for controllably moving the irregularly moveable surface 5 as described above.

It will be understood that the conveyor arrangement 1 and the actuator 30 form the basis of the apparatus for separating objects, and may form a separate product. The other components, i.e. one or more of the camera system 60, the robot 70 and the control unit 80, may be added to further enhance the functionality of the apparatus for separating objects.

Figure 9:
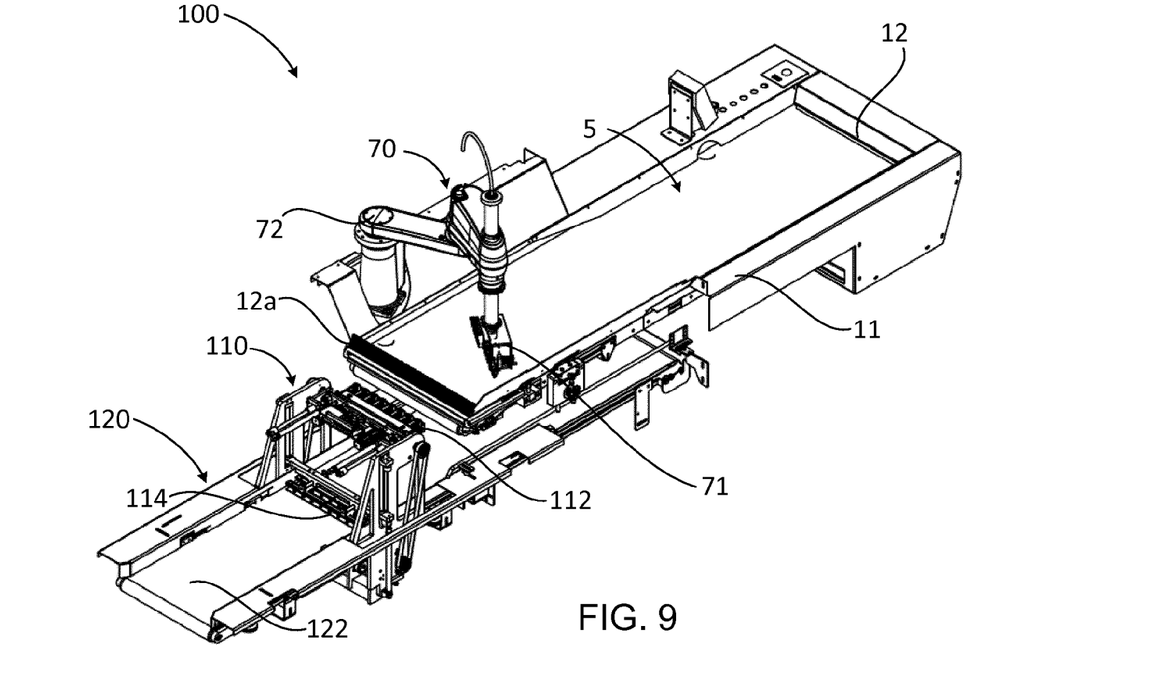
FIG. 9 shows an elevated view of an apparatus for placing plant cuttings in a cultivation unit.

Embodiments of an apparatus for separating objects may be used in many applications. A suitable application could be the use for separating plant cuttings that are to be automatically placed in a cultivation medium. FIG. 9 shows an elevated view of an apparatus 100 for placing plant cuttings in a cultivation medium that uses an apparatus for separating objects according to an embodiment of the invention.

The plant cuttings may be cuttings of any sort, and may include cuttings having a stem and one or more leafs, further referred to as stem cuttings, cuttings predominantly consisting of leafs, further referred to as leaf cuttings, as well as cuttings having a turnip further referred to as turnip cuttings. Examples of stem cuttings include, but are not limited to, cuttings of *chrysanthemum*, Christmas star, boxwood, flamingo flower ('*anthurium*'), and panda plant ('*kalanchoe*'). Examples of leaf cuttings include, but are not limited to, cuttings of crab cactuse, and conifer. Examples of turnip cuttings include, but are not limited to cuttings of cranesbill ('*geranium*').

The apparatus 100 comprises a conveyor apparatus comprising a cutting receiving surface 5 via which a plurality of cuttings is supplied. The cuttings may be supplied via an inlet or may be dropped onto the surface 5 from above, either manually by a human operator or automatically, for example via a further conveyor belt.

Preferably, the cutting receiving surface 5 is surrounded by side walls 11 and end walls 12. The side and end walls 11, 12 ensure that cuttings do not fall down.

The apparatus 100 further comprises a camera system, such as the camera system 60 shown in FIG. 8, for identifying cuttings among the plurality of cuttings that are suitable for individual pick up. The camera system comprises one or more cameras, such as cameras 62 depicted in FIG. 8. Based on images obtained with the one or more cameras cuttings that are suitable for individual pick up are identified using pattern recognition techniques. For example, in case of stem cuttings, the camera system may be arranged to identify individual stems based on the recognition of a pattern corresponding to an individual stem of a stem cutting lying on the bottom of the cuttings supply system. The images provided by the camera system may be any type of suitable image including 2-dimensional images and 3-dimensional images. In case of 3-dimensional imaging, the camera system generally includes more than one camera.

The apparatus further comprises a pick-up tool or robot 70. The pick-up tool 70 is communicatively coupled to the camera system as is schematically shown in FIG. 8. The pick-up tool 30 is arranged for picking up cuttings identified by the camera system among the plurality of cuttings and suitably placing picked-up cuttings in a planting system 110.

Preferably, the pick-up tool 70 is provided with one or more gripping arrangements 71, each gripping arrangement 71 comprising one or more grippers. The term gripper should be understood to include any type of gripper including but not limited to mechanical grippers and suction cups.

The pick-up tool 70 may comprise a robot arm 72 with sufficient degrees of freedom to enable suitably placement of picked-up cuttings in the planting system 110. In some applications a robot arm 72 having 4 degrees of freedom, i.e. 3 rotation axes, where one axis is arranged to allow transfer along the axis (preferably in a direction substantially perpendicular to the cutting receiving surface 5) is sufficient. In some other applications a more sophisticated robot arm 72 is needed, for example a robot arm 72 capable of picking up cuttings in all kinds of three-dimensional (3D) orientations using 3D-images. Such more sophisticated robot arm 72 may be arranged to operate with 6 degrees of freedom.

The robot arm 72 is programmed to move the one or more grippers towards a suitable cutting on the surface 5, and to bring a gripper of the gripper arrangement 71 in a suitable gripping position. For this purpose, the cutting position (for example using x,y-coordinates as will be understood by a person skilled in the art) and the orientation of the cutting are used as input, where these parameters are obtained using the camera system. Starting from this gripping position the gripper is arranged to perform a predetermined gripping action.

The planting system 110 is preferably arranged for simultaneously planting multiple cuttings in a cultivation medium. The pick-up tool 70 may move back and forth between the surface 5 and the planting system 110 to provide the multiple cuttings that are to be planted simultaneously. The planting system 110 may include a planting unit 112 and/or an indentation unit 114. The planting unit 112 is arranged to accommodate multiple cuttings in a predetermined orientation. The indentation unit 114 is arranged for indenting the cultivation medium, i.e. it makes holes of suitable size and shape to accommodate a cutting to be planted. The indentation unit 114 is arranged to indent the cultivation medium before the planting unit plants the cuttings in indentations made with the indentation unit. The planting unit 112 and the indentation unit 114 may be rigidly connected to each other, for example by connection to a common frame, to simplify alignment of the holes made in the cultivation medium and the components within the planting unit to arrange the planting of the cuttings.

The apparatus 100 may further comprise a cultivation medium supply unit 120 for supplying the cultivation medium. The cultivation medium may be provided in a predefined format, for example in the form of soil cubes with suitable dimensions (e.g. length×width×height of 40 mm×40 mm×30 mm). The cultivation medium may be any medium suitable for cultivating cuttings. Examples of suitable cultivation media include but are not limited to a soil block, a soil cube, rock wool, and flower soil.

The cultivation medium supply unit 120 preferably takes the form of a conveyor belt 122. The conveyor belt 112 may then be aligned with the indentation unit 114 and the planting unit 112. In some embodiments, such alignment means that the conveyor belt 122 transfers a portion of the cultivation medium that is indented by the indentation unit 114 towards a position at which the planting unit 112 can place a cutting in the hole made in the cultivation medium.

The side and/or end walls 11, 12 may be solid. Alternatively, at least one side wall 11 or end wall 12 may be at least partially permeable. For example, in the embodiment shown in FIG. 9, the side wall 12a facing the planting system 110 comprises a plurality of brushes. Such brushes may brush off debris from the picking tool 70. In particular, the robot arm 72 of the pick-up tool 70 may move the grippers through the brushes to clean the grippers after placement of cuttings in the planting system 110.

It will be understood by the skilled person that an apparatus for separating non-living objects can be used in an analogous way. For example, in such case, the planting unit may be a unit to fill containers with a predetermined number of objects and the cultivation medium supply unit may be a conveyer transferring such containers. Of course, other analogous uses of the apparatus may be thought of as well.

The invention has been described by reference to certain embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention, which is defined in the accompanying claims.

The invention claimed is:

1. An apparatus for separating objects comprising:
a conveyor arrangement comprising a conveyor belt disposed as an endless loop over two rollers, the conveyor belt having a substantially horizontally arranged surface for receiving a plurality of objects; and
an actuator comprising a drive axis connectible to a motor so as to enable rotational movement of the drive axis, an actuating structure, and a connection structure connecting the drive axis with the actuating structure for converting rotational motion of the drive axis into a movement of the actuating structure in a direction substantially perpendicular to the object receiving surface plane, wherein the actuating structure is located underneath the conveyor belt for creating movement of the surface in a direction substantially perpendicular to the object receiving surface plane;
wherein the conveyor arrangement and the actuator are independently controllable.

2. The apparatus according to claim 1, wherein the actuating structure is arranged to create irregular movement of the object receiving surface.

3. The apparatus according to claim 1, wherein the conveyor belt is controllably moveable in two mutually opposing directions by actuation of at least one of the two rollers.

4. The apparatus according to claim 1, further comprising a belt tensioning roller mounted on an arm that is pivotably connected to the actuating structure.

5. The apparatus according to claim 3, wherein the actuating structure further comprises a guiding roller connected at a position at a side of the actuating structure facing away from the belt tensioning roller.

6. The apparatus according to claim 1, wherein the conveyor arrangement further comprises a plate between the two rollers for supporting the object receiving surface of the conveyor belt.

7. The apparatus according to claim 6, wherein the plate is provided with a plurality of holes.

8. The apparatus according to claim 7, wherein the holes take the form of slits oriented in a direction substantially parallel to the direction of movement of the conveyor belt.

9. The apparatus according to claim 8, wherein the slits are provided with rounded ends.

10. The apparatus according to claim 1, wherein the actuating structure extends over the entire width of the conveyor belt.

11. The apparatus according to claim 10, wherein the actuating structure has a U-profile.

12. The apparatus according to claim 1, wherein the extent of movement in a direction substantially perpendicular to the object receiving surface of the conveyor belt is adjustable.

13. The apparatus according to claim 1, further comprising a camera system comprising one or more cameras for obtaining one or more images of the plurality of objects on the object receiving surface.

14. The apparatus according to claim 13, further comprising a light source located underneath the object receiving surface, wherein the conveyor belt is made of a material substantially transparent for radiation emitted by the light source.

15. The apparatus according to claim 13, further comprising a robot provided with a gripping system provided with one or more grippers for picking up individual objects from the object receiving surface for further processing based on information obtained from the one or more images obtained with the camera system.

16. The apparatus according to claim 13, further comprising a control unit for independently controlling movement of the conveyor belt and the actuator based on information obtained from the one or more images obtained with the camera system.

17. A method of separating objects comprising:

supplying a plurality of objects to an apparatus for separating objects according to any one of the preceding claims; and independently controlling movement of the conveyor belt and the actuating structure to separate the plurality of objects.

18. The method according to claim 17, wherein the apparatus further comprises a camera system comprising one or more cameras for obtaining one or more images of the plurality of objects on the object receiving surface, and wherein independently controlling of the movement of the conveyor belt and the actuator is performed based on analysis of the one or more images.

19. The method of claim 18, wherein the apparatus further comprises a robot provided with a gripping system provided with one or more grippers for picking up individual objects from the object receiving surface, the method further comprising:

identifying individual objects among the plurality of objects that are suitable for individual pick up by means of the one or more images obtained with the camera system; and picking up an identified object with the robot for further processing.

20. The method according to claims 17, wherein the apparatus further comprises a control unit being provided with a movement program, and wherein independently controlling movement of the conveyor belt and the actuating structure is executed by the control unit by activating the movement program.

21. A non-transient computer readable medium having computer readable instructions stored thereon for performing, when executed by a processor, the method as defined by claim 17.

* * * * *